US010958638B2

(12) United States Patent
Doi et al.

(10) Patent No.: US 10,958,638 B2
(45) Date of Patent: *Mar. 23, 2021

(54) SECURELY SHARING CONFIDENTIAL INFORMATION IN A DOCUMENT

(71) Applicant: International Business Machines Corporation, Armonk, NY (US)

(72) Inventors: Masashi Doi, Yokohama (JP); Kenya Ishimoto, Tokyo (JP); Nobuyuki Yoshifuji, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/426,664

(22) Filed: May 30, 2019

(65) Prior Publication Data
US 2019/0281044 A1   Sep. 12, 2019

Related U.S. Application Data

(63) Continuation of application No. 15/452,043, filed on Mar. 7, 2017, now Pat. No. 10,362,025.

(51) Int. Cl.
*H04L 29/06* (2006.01)
*G06F 21/62* (2013.01)
*H04L 9/08* (2006.01)

(52) U.S. Cl.
CPC ........ *H04L 63/083* (2013.01); *G06F 21/6245* (2013.01); *H04L 9/0863* (2013.01);
(Continued)

(58) Field of Classification Search
CPC ... H04L 63/083; H04L 9/0866; H04L 9/0863; H04L 63/105; H04L 63/0428; G06F 21/6245
See application file for complete search history.

(56) References Cited

U.S. PATENT DOCUMENTS

| 7,861,096 B2 | 12/2010 | Staddon |
| 7,913,167 B2 | 3/2011 | Cottrille |

(Continued)

FOREIGN PATENT DOCUMENTS

| JP | 2008027167 A | 2/2008 |
| JP | 2010262322 A | 11/2010 |
| JP | 2011134209 A | 7/2011 |

OTHER PUBLICATIONS

List of IBM Patents or Patent Applications Treated as Related. Filed May 30, 2019. 2 pages.

*Primary Examiner* — Christopher A Revak
(74) *Attorney, Agent, or Firm* — Edward Li

(57) ABSTRACT

A method, a computer program product, and a computer system for securely sharing confidential information in a document. A first computer sets one or more confidential attributes of the confidential information in the document and creates metadata of the confidential information. The first computer creates a first file including the confidential information and the metadata. The first computer creates a second file including non-confidential information in the document and the metadata; the metadata in the second file is as a reference to the confidential information. The confidential information in the first file is displayed by a second computer at a confidential information visibility level in accordance with an authorization level of an authorized user of the second computer. The second file is displayed at a visibility level without showing the confidential information and is accessible by all users.

15 Claims, 18 Drawing Sheets

(52) U.S. Cl.
CPC ........ *H04L 9/0866* (2013.01); *H04L 63/0428* (2013.01); *H04L 63/105* (2013.01)

(56) References Cited

U.S. PATENT DOCUMENTS

| | | |
|---|---|---|
| 8,468,244 B2 | 6/2013 | Redlich |
| 8,649,552 B2 | 2/2014 | Balakrishnan et al. |
| 8,699,704 B2 | 4/2014 | Liu |
| 9,286,457 B2 | 3/2016 | Beatson |
| 9,898,610 B1 | 2/2018 | Hadsall |
| 10,362,025 B2 * | 7/2019 | Doi ................ H04L 9/0863 |
| 10,367,807 B2 * | 7/2019 | Doi ................ H04L 63/105 |
| 10,411,887 B2 | 9/2019 | Will |
| 2013/0024769 A1 | 1/2013 | Sumida et al. |
| 2014/0230066 A1 | 8/2014 | Hurwitz et al. |
| 2015/0052346 A1 | 2/2015 | Margolin |
| 2015/0365385 A1 | 12/2015 | Hore |
| 2018/0262480 A1 | 9/2018 | Doi |
| 2018/0262481 A1 | 9/2018 | Doi |

\* cited by examiner

Key Features of the Invention and Prior Art
- Restriction on handling of documents that contains confidential information is implemented by raising their confidentiality level in order to restrict the range of persons who are allowed to access them. For further reduction of risks, encryption of the entire document file and specification of a password are also traditionally implemented in addition to simple clarification of the confidentiality level. In this case, the encrypted document is often sent by an e-mail that is different than the one to which the password is attached. However, such a scheme entails the following problems.
  - Since the confidential information is contained in the document body, cracking of the password of the document leads to unauthorized access to the confidential information.
  - Access to the entire document is restricted even when only part of it corresponds to the confidential information.
- The present invention is a document editing and reading system that supports separation and storage of the part of the document corresponding to the confidential information from the remaining part of the document and merging of the separated part and the remaining part at the time of reading and editing. This system will have the following effects.
  - Since the confidential part is separated from the document body, the entire security level is decreased.
  - By virtue of this, documents are allowed to be used without access restriction thereof.
- The processing steps of the present inventions are illustrated below:

FIG. 4(A)

SECURELY SHARING CONFIDENTIAL INFORMATION IN A DOCUMENT

BACKGROUND

The present invention relates generally to management of an electronic document, and more particularly to secure sharing of documents in computer networks.

In order to limit the access to confidential information in a document, confidential classification of the document is increased. Conventionally, in order to further reduce the risk, the entire document is simply encrypted and/or a password is set for the document, in addition to merely increasing the confidential classification of the document. When the document is sent out for sharing, often the password is sent through a separate e-mail; however, there are the following problems. (1) The confidential information is included in the document. If the password is compromised, the confidential information is accessed. (2) The access to the entire document is restricted, even though only a portion of the document is confidential information.

SUMMARY

In one aspect, a method for securely sharing confidential information in a document is provided. The method includes setting, by a first computer, one or more confidential attributes of the confidential information in the document, wherein the one or more confidential attributes include one or more visibility levels of the confidential information and one or more authorization levels of access to the confidential information. The method further includes creating, by the first computer, metadata of the confidential information, wherein the metadata includes information of the one or more confidential attributes. The method further includes creating, by the first computer, a first file including the confidential information and the metadata. The method further includes creating, by the first computer, a second file including non-confidential information in the document and the metadata, wherein the metadata in the second file is as a reference to the confidential information. The confidential information in the first file is displayed by a second computer at a confidential information visibility level in accordance with an authorization level of an authorized user of the second computer. The second file is displayed at a visibility level of showing no confidential information, and the second file is accessible by all users.

In another aspect, a computer program product for securely sharing confidential information in a document is provided. The computer program product comprises a computer readable storage medium having program code embodied therewith. The program code is executable to set, by a first computer, one or more confidential attributes of the confidential information in the document, wherein the one or more confidential attributes include one or more visibility levels of the confidential information and one or more authorization levels of access to the confidential information. The program code is executable to create, by the first computer, metadata of the confidential information, wherein the metadata includes information of the one or more confidential attributes. The program code is executable to create, by the first computer, a first file including the confidential information and the metadata. The program code is executable to create, by the first computer, a second file including non-confidential information in the document and the metadata, wherein the metadata in the second file is as a reference to the confidential information. The confidential information in the first file is displayed by a second computer at a confidential information visibility level in accordance with an authorization level of an authorized user of the second computer. The second file is displayed at a visibility level of showing no confidential information, and the second file is accessible by all users.

In yet another aspect, a computer system for securely sharing confidential information in a document is provided. The computer system comprises one or more processors, one or more computer readable tangible storage devices, and program instructions stored on at least one of the one or more computer readable tangible storage devices for execution by at least one of the one or more processors. The program instructions are executable to: set, by a first computer, one or more confidential attributes of the confidential information in the document, wherein the one or more confidential attributes include one or more visibility levels of the confidential information and one or more authorization levels of access to the confidential information; create, by the first computer, metadata of the confidential information, wherein the metadata includes information of the one or more confidential attributes; create, by the first computer, a first file including the confidential information and the metadata; and create, by the first computer, a second file including non-confidential information in the document and the metadata, wherein the metadata in the second file is as a reference to the confidential information. The confidential information in the first file is displayed by a second computer at a confidential information visibility level in accordance with an authorization level of an authorized user of the second computer. The second file is displayed at a visibility level of showing no confidential information, and the second file is accessible by all users.

BRIEF DESCRIPTION OF THE SEVERAL VIEWS OF THE DRAWINGS

FIG. 4(A) is a diagram illustrating a text document containing non-confidential information and confidential information, in accordance with one embodiment of the present invention.

DETAILED DESCRIPTION

Embodiments of the present invention disclose a document editing and reading system that supports separating confidential information in a document from the remaining non-confidential part of the same document. The system saves the confidential information in a confidential part file and saves the remaining non-confidential part in a public part file. The disclosed system also supports merging of the separated part (the confidential part file) and the remaining part (the public part file) at the time of reading and editing by an authorized user. The disclosed system will have the following effects. Since the confidential part file is physically separated from the public part file, it is made possible to raise the entire security level of the confidential information. The public part file can be used as an encryption key for encrypting the confidential information in the confidential part file. Since the confidential part file is separated from the public part file, the level of confidentiality of the public part file is allowed to be lowered; therefore, the document can be effectively used. Embodiments of the present invention also disclose different visibility levels or display modes of the confidential information in accordance with access authorization levels.

Figure 1:
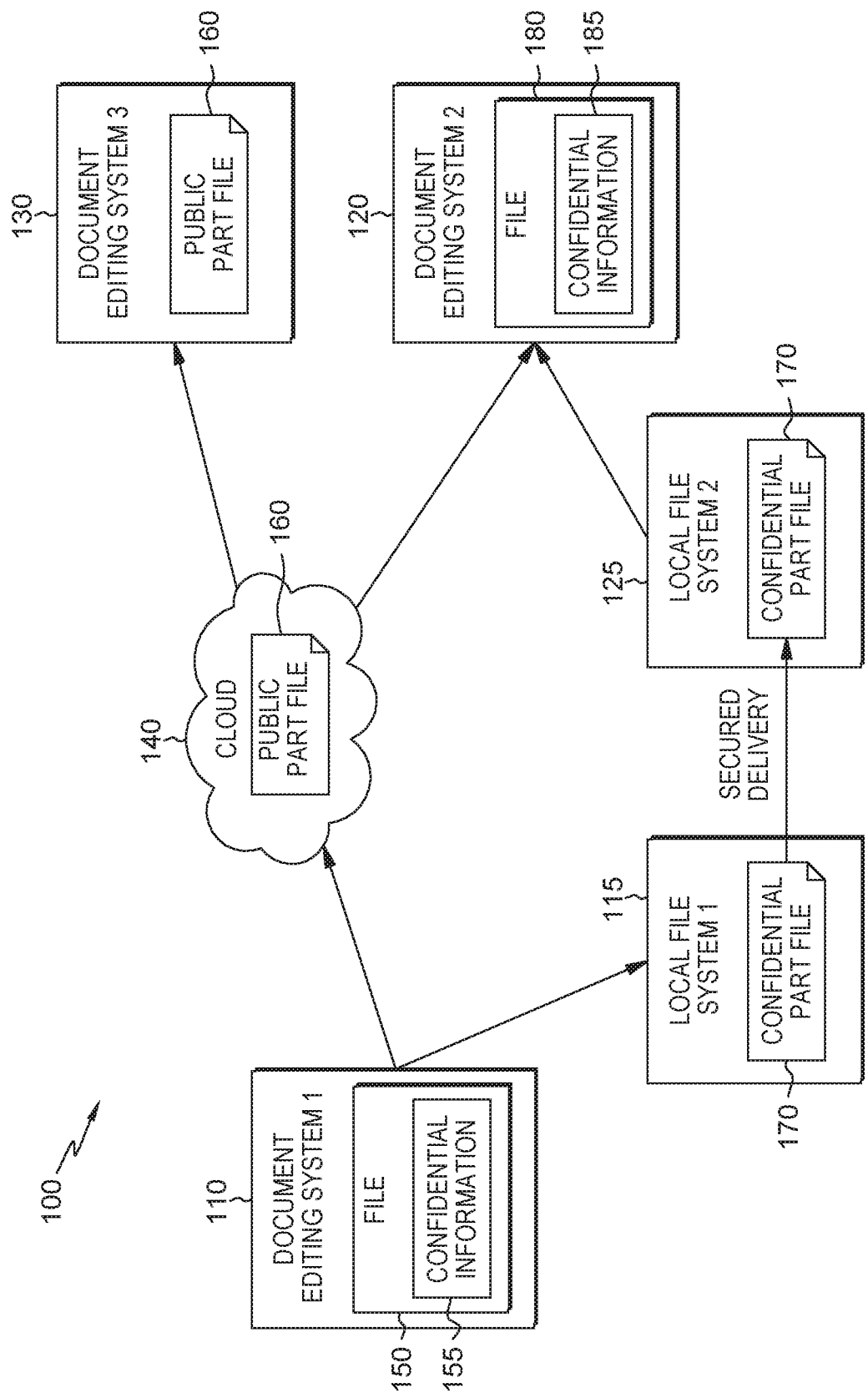
FIG. 1 is a diagram illustrating a system for secure sharing of a file containing confidential information, in accordance with one embodiment of the present invention.

FIG. 1 is a diagram illustrating system 100 for secure sharing of a file containing confidential information, in accordance with one embodiment of the present invention. In the embodiment, system 100 comprises document editing system 1 (110), document editing system 2 (120), and document editing system 3 (130). Document editing system 1 (110) is used by an editor of file 150 which includes confidential information 155. Document editing system 1 (110) sets confidential attributes of confidential information 155, after receiving the confidential attributes given by the editor. The confidential attributes include IDs, locations, and sizes of confidential information 155. The confidential attributes further include visibility levels of confidential information 155 and authorization levels. Document editing system 1 (110) stores confidential information 155 into confidential part file 170 in local file system 1 (115). Document editing system 1 (110) writes the remaining part (or non-confidential information) of file 150 into public part file 160. Public part file 160 is shared through cloud 140 and it is without confidential information 155 of file 150. Confidential information 155 of file 150 is not sent to cloud 140 while public part file 160 in cloud 140 is edited.

Referring to FIG. 1, confidential part file 170 is delivered through a secured channel such as email or secured network, from local file system 1 (115) to local file system 2 (125). Both local file system 1 (115) and local file system 2 (125) are secured file systems. On document editing system 2 (120), an authorized user can access confidential part file 170 in local file system 2 (125) as well as public part file 160 in cloud 140. Document editing system 2 (120) merges confidential part file 170 and public part file 160, and it renders file 180 including confidential information 185. Confidential information 185 is displayed at visibility levels or in display modes of the confidential information, in accordance with an access authorization level of the authorized user. On document editing system 3 (130), an unauthorized user or reader can only access public part file 160 in cloud 140.

Figure 2:
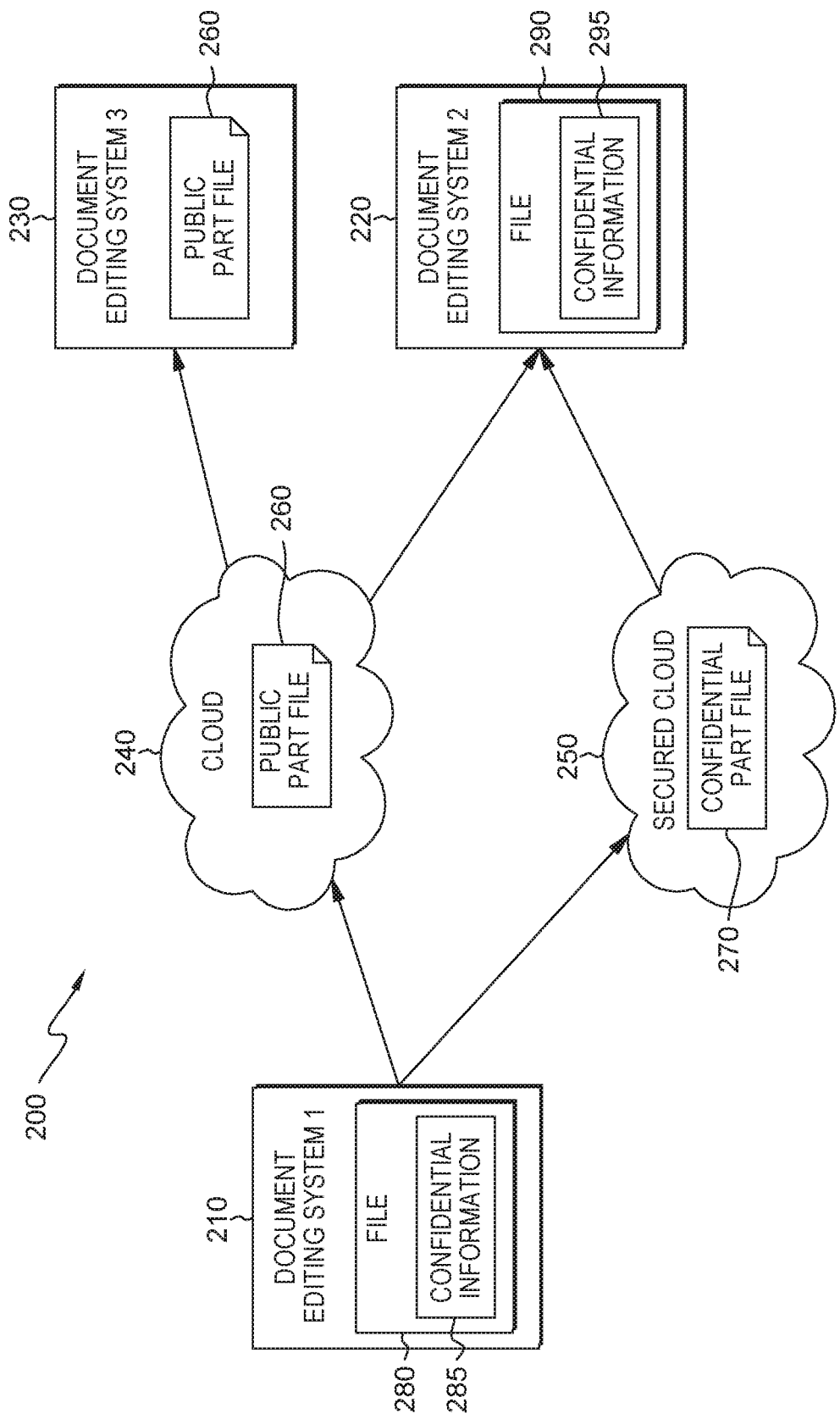
FIG. 2 is a diagram illustrating another system for secure sharing of a file containing confidential information, in accordance with one embodiment of the present invention.

FIG. 2 is a diagram illustrating system 200 for secure sharing of a file containing confidential information, in accordance with one embodiment of the present invention. In the embodiment, system 200 comprises document editing system 1 (210), document editing system 2 (220), and document editing system 3 (230). Document editing system 1 (210) is used by an editor of file 280 which includes confidential information 285. Document editing system 1 (210) sets confidential attributes of confidential information 285, after receiving the confidential attributes given by the editor. The confidential attributes include IDs, locations, sizes, visibility levels of confidential information 285, and authorization levels. Document editing system 1 (210) stores confidential information 285 into confidential part file 270 in secured cloud 250. Document editing system 1 (210) writes the remaining part (or non-confidential information) of file 280 into public part file 260. Public part file 260 is shared through cloud 240 and it is without confidential information 285 of file 280. Confidential part file 270 is shared through secure cloud 250.

On document editing system 2 (220), an authorized user can access confidential part file 270 in secured cloud 250 as well as public part file 260 in cloud 240. Document editing system 2 (220) merges confidential part file 270 and public part file 260, and it renders file 290 including confidential information 295. Confidential information 295 is displayed at visibility levels or in display modes of the confidential information, in accordance with an access authorization level of the authorized user. On document editing system 3 (230), an unauthorized user or reader can only access public part file 260 in cloud 240.

Figure 3:
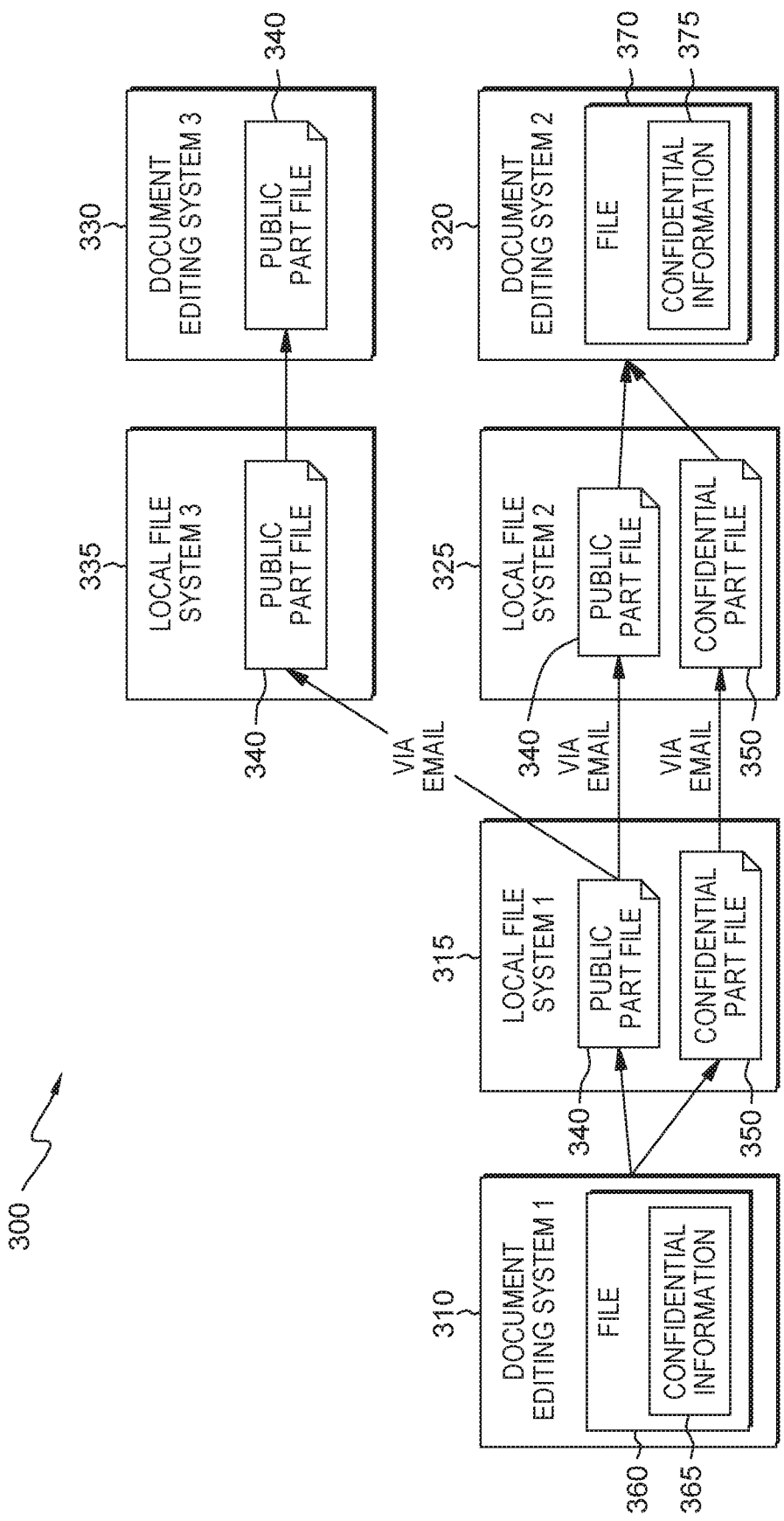
FIG. 3 is a diagram illustrating yet another system for secure sharing of a file containing confidential information, in accordance with one embodiment of the present invention.

FIG. 3 is a diagram illustrating system 300 for secure sharing of a file containing confidential information, in accordance with one embodiment of the present invention. In the embodiment, system 300 comprises document editing system 1 (310), document editing system 2 (320), and document editing system 3 (330). Document editing system 1 (310) is used by an editor of file 360 which includes confidential information 365. Document editing system 1 (310) sets confidential attributes of confidential information 365, after receiving the confidential attributes given by the editor. The confidential attributes include IDs, locations, sizes, visibility levels of confidential information 365, and authorization levels. Document editing system 1 (310) stores confidential information 365 into confidential part file 350 in local file system 1 (315). Document editing system 1 (310) writes the remaining part (or non-confidential information) of file 360 into public part file 340. Document editing system 1 (310) stores public part file 340 in local file system 1 (315).

Referring to FIG. 3, confidential part file 350 and public part file 340 are delivered through a secured channel such as email or like, from local file system 1 (315) to local file system 2 (325). Both local file system 1 (315) and local file system 2 (325) are secured file systems. Public part file 340 is also delivered through email or like, from local file system 1 (315) to local file system 3 (335).

On document editing system 2 (320), an authorized user can access confidential part file 350 as well as public part file 340 in local file system 2 (325). Document editing system 2 (320) merges confidential part file 350 and public part file 340 and renders file 370 including confidential information 375. Confidential information 375 is displayed at visibility levels or in display modes of the confidential information, in accordance with an authorization level of the authorized user. On document editing system 3 (330), an unauthorized user or reader can only access public part file 340 in local file system 3 (335).

The confidential information (such as confidential information 155 shown in FIG. 1) may exist as multiple separated parts in a document (such as file 150 shown in FIG. 1). A user gives different confidential attributes to respective ones of the multiple separated parts of the confidential information. A document editing system (such as document editing system 1 110 shown in FIG. 1) sets the different confidential attributes to respective ones of the multiple separated parts of the confidential information. The confidential attributes include IDs, locations, and sizes of the confidential information. The confidential attributes further include visibility levels of the confidential information and authorization levels.

When the document is edited on the document editing system, according to the confidential attributes given by the user, the document editing system specifies following visibility levels or display modes of the confidential information in a public part file (such as public part file 160 shown in FIG. 1). (1) A dummy visibility level or display mode: Content of the confidential information in the public part file is replaced and displayed by dummy content (e.g., dummy text in a document file). Nothing will be displayed if the content is not specified. A reader of the public part file is not aware of the fact that the confidential information exists. (2) A marker visibility level or display mode: Content of the confidential information in the public part file is replaced and displayed by a marker or icon. A reader of the public part file is allowed to be aware of the presence of the confidential information, but the reader cannot recognize its size (e.g., the number of characters). (3) A range visibility level or display mode: Content of the confidential information in the public part file is replaced and displayed by a range. A reader of the public part file is allowed to recognize the presence of the confidential information and its specific size. In the above-mentioned visibility levels or display modes, the dummy visibility level or display mode ensures the highest level of confidentiality, the marker visibility level or display mode provides the medium level of confidentiality, and the range visibility level or display mode gives the lowest level of confidentiality.

While the entire public part file can be defined by one of the above-mentioned visibility levels or display modes, the respective ones of the multiple separated parts of the confidential information can be defined by the different visibility levels or display modes mentioned-above. The information of the visibility levels or display modes is stored in the public part file and it determines how the confidential information is to be displayed. An example of the information the visibility levels or display modes is shown in Table 1. In Table 1, different visibility levels are given to different parts (such as Part #1, Part #3 and Part #4) of the confidential information. Table 1 shows that there is a default visibility level for the public part file. The default visibility level determines the visibility level of a part (such as Part #2) whose visibility level is not defined.

TABLE 1

| Parts of the Confidential Information | Visibility Levels or Display Modes |
| --- | --- |
| Default | Dummy |
| Part #1 | Range |
| Part #2 | — |
| Part #3 | Marker |
| Part #4 | Range |

Figure 4B:
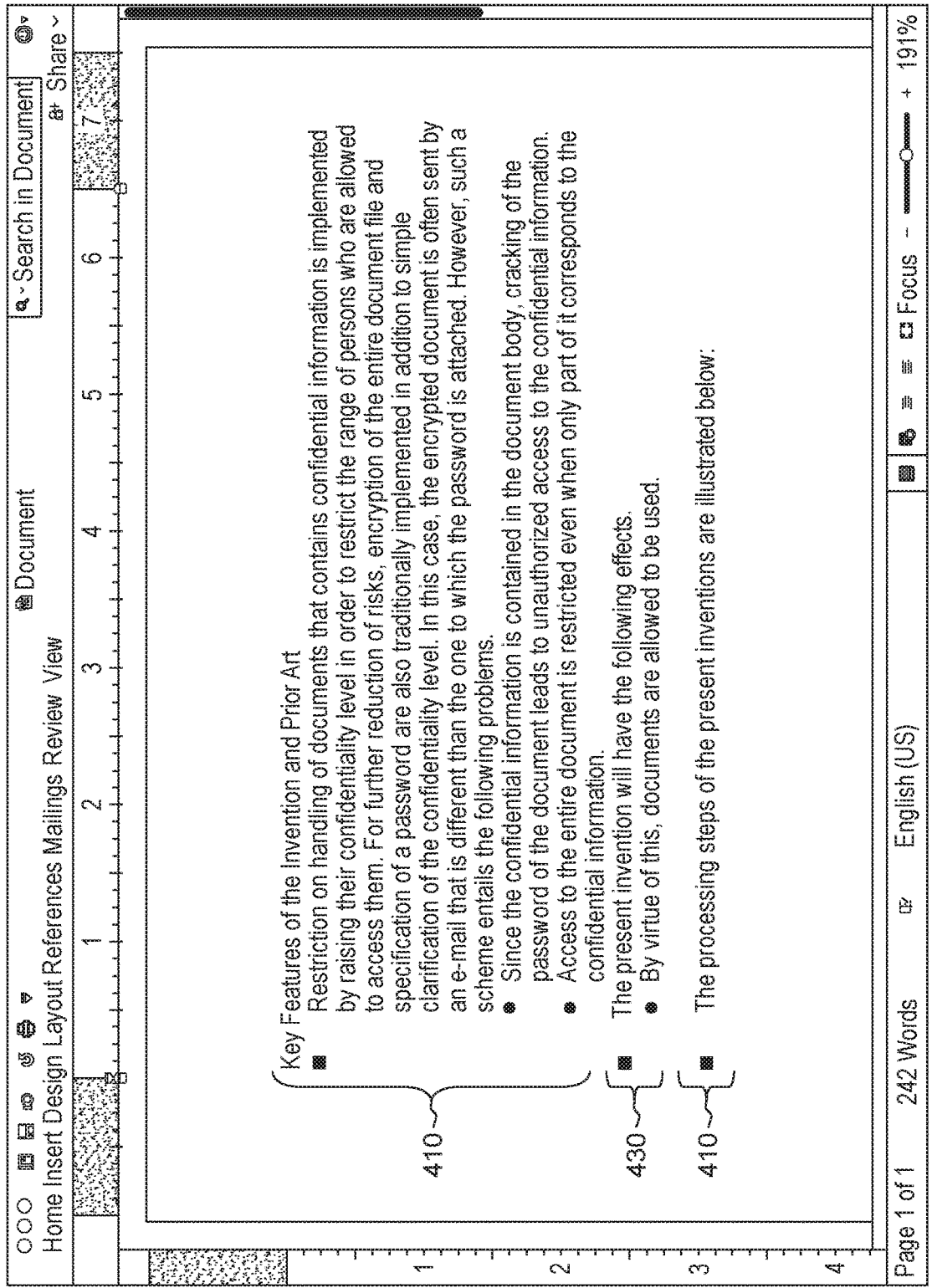
FIG. 4(B) is a diagram illustrating a dummy visibility level or display mode of the confidential information in the text document shown in FIG. 4(A), in accordance with one embodiment of the present invention.
Figure 4C:
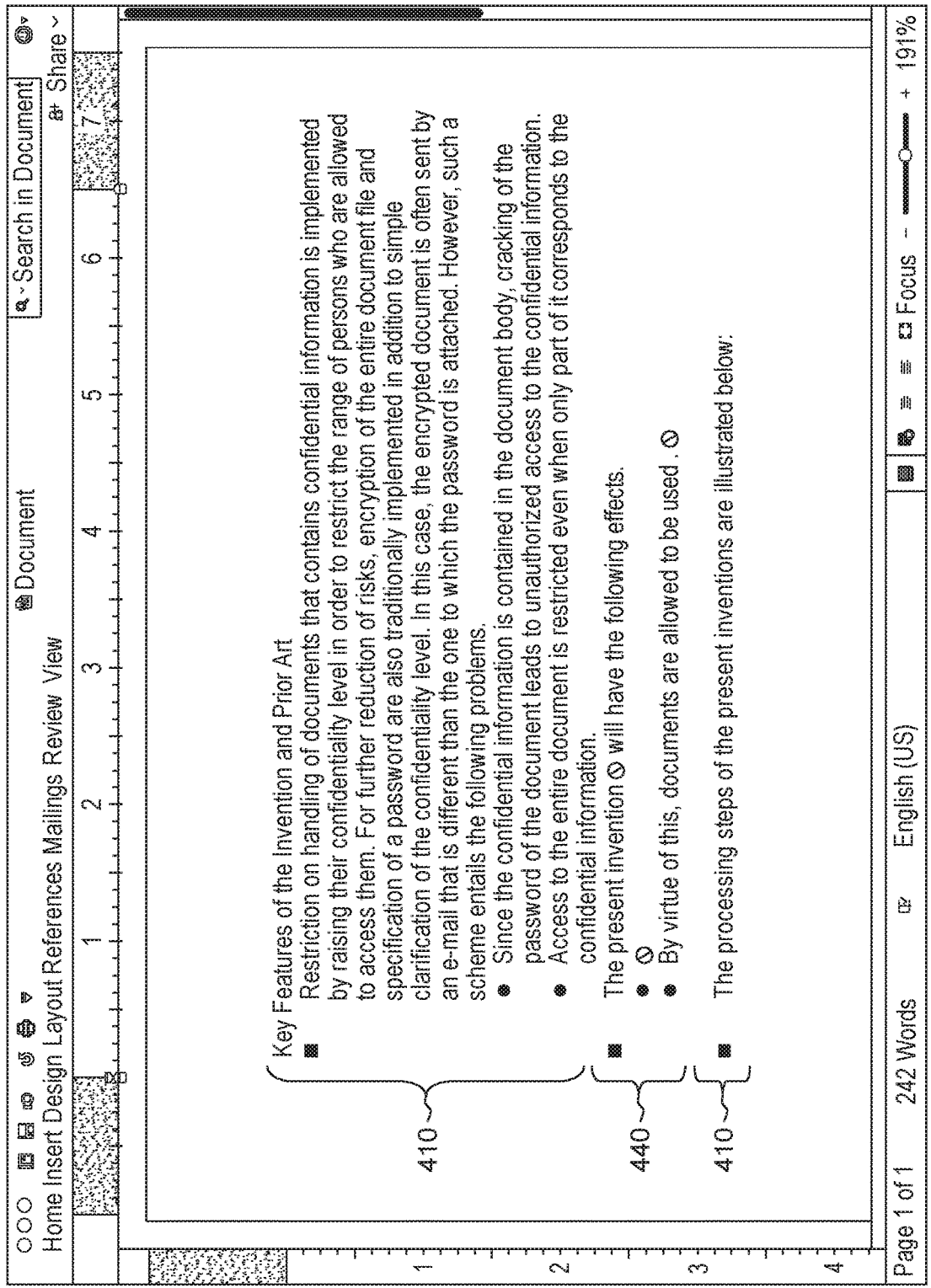
FIG. 4(C) is a diagram illustrating a marker visibility level or display mode of the confidential information in the text document shown in FIG. 4(A), in accordance with one embodiment of the present invention.
Figure 4D:
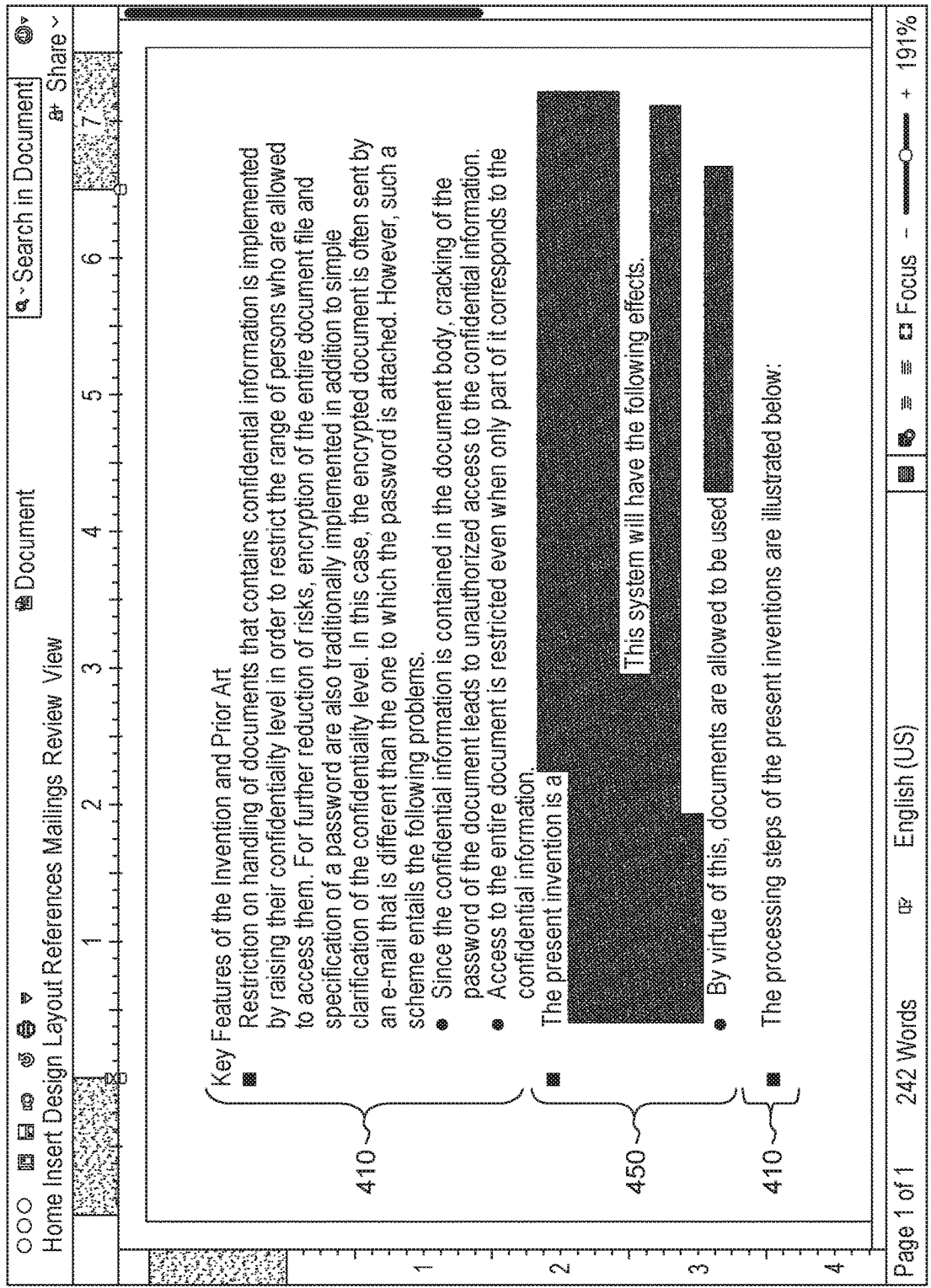
FIG. 4(D) is a diagram illustrating a range visibility level or display mode of the confidential information in the text document shown in FIG. 4(A), in accordance with one embodiment of the present invention.

FIG. 4(A) is a diagram illustrating a text document containing non-confidential information 410 and confidential information 420, in accordance with one embodiment of the present invention. FIG. 4(B) is a diagram illustrating a dummy visibility level or display mode of confidential information 420 in the text document shown in FIG. 4(A), in accordance with one embodiment of the present invention. With the dummy visibility level or display mode, content of non-confidential information 410 is displayed but content of confidential information 420 is not displayed, as shown by numeral 430. A reader is not aware that the confidential information exists. FIG. 4(C) is a diagram illustrating a marker visibility level or display mode of confidential information 420 in the text document shown in FIG. 4(A), in accordance with one embodiment of the present invention. With the marker visibility level or display mode, content of non-confidential information 410 is displayed; however, content of confidential information 420 is replaced by marker ☐, as shown by numeral 440. With the marker visibility level or display mode, a reader is aware of the presence of the confidential information, but the reader cannot know how many characters are replaced. FIG. 4(D) is a diagram illustrating a range visibility level or display mode of confidential information 420 in the text document shown in FIG. 4(A), in accordance with one embodiment of the present invention. With the range visibility level or display mode, content of non-confidential information 410 is displayed; however, content of confidential information 420 is blocked, as shown by numeral 450. A reader recognizes the presence of the confidential information and is also aware of its specific size.

Figure 5A:
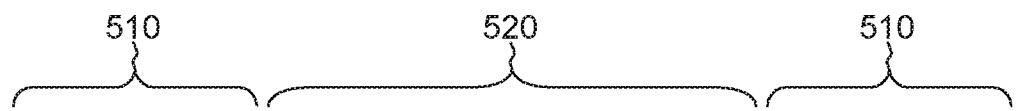
FIG. 5(A) is a diagram illustrating a spreadsheet document containing non-confidential information and confidential information, in accordance with one embodiment of the present invention.
Figure 5B:
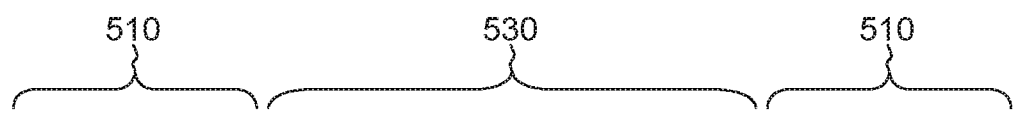
FIG. 5(B) is a diagram illustrating a dummy visibility level or display mode of the confidential information in the spreadsheet document shown in FIG. 5(A), in accordance with one embodiment of the present invention.
Figure 5C:
FIG. 5(C) is a diagram illustrating a marker visibility level or display mode of the confidential information in the spreadsheet document shown in FIG. 5(A), in accordance with one embodiment of the present invention.
Figure 5D:
FIG. 5(D) is a diagram illustrating a range visibility level or display mode of the confidential information in the spreadsheet document shown in FIG. 5(A), in accordance with one embodiment of the present invention.

FIG. 5(A) is a diagram illustrating a spreadsheet document containing non-confidential information 510 and confidential information 520, in accordance with one embodiment of the present invention. FIG. 5(B) is a diagram illustrating a dummy visibility level or display mode of confidential information 520 in the spreadsheet document shown in FIG. 5(A), in accordance with one embodiment of the present invention. With the dummy visibility level or display mode, content of non-confidential information 510 is displayed; however, content of confidential information 520 is replaced by dummy content, as shown by numeral 530. A reader does not know the existence of the confidential information and does not know real data in the cells of the confidential information. FIG. 5(C) is a diagram illustrating a marker visibility level or display mode of confidential information 520 in the spreadsheet document shown in FIG. 5(A), in accordance with one embodiment of the present invention. With the marker visibility level or display mode, content of non-confidential information 510 is displayed; however, content of confidential information 520 is replaced by marker ☐, as shown by numeral 540. A reader is aware of the presence of cells containing the confidential information, but the reader cannot know how many cells are replaced. FIG. 5(D) is a diagram illustrating a range visibility level or display mode of confidential information 520 in the spreadsheet document shown in FIG. 5(A), in accordance with one embodiment of the present invention. With the range visibility level or display mode, content of non-confidential information 510 is displayed; however, content of confidential information 520 is blocked, as shown by numeral 550. A reader does not only recognize the presence of cells containing the confidential information but also know how many cells contain the confidential information.

Figure 6A:
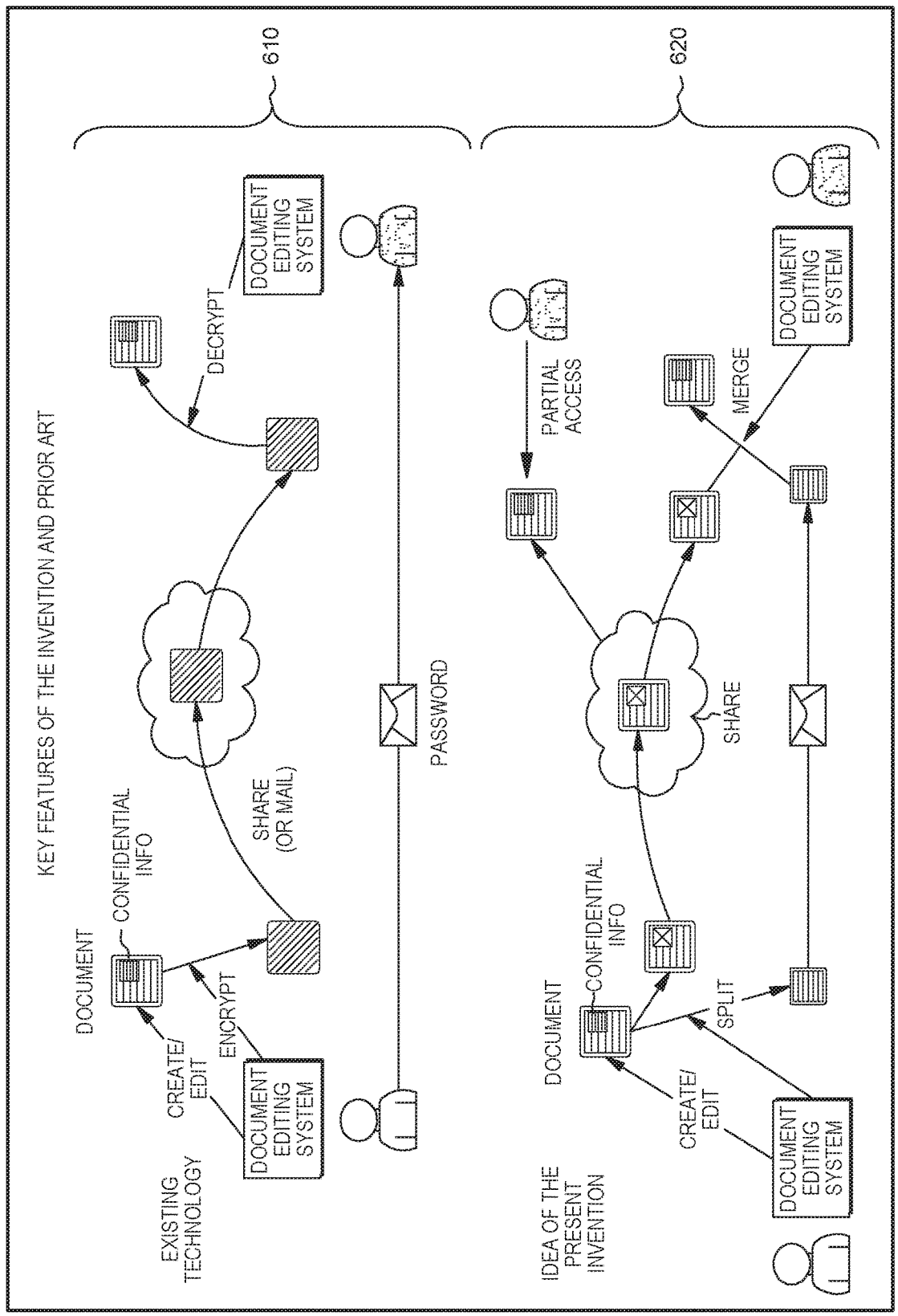
FIG. 6(A) is a diagram illustrating a presentation document containing non-confidential information and confidential information, in accordance with one embodiment of the present invention.
Figure 6B:
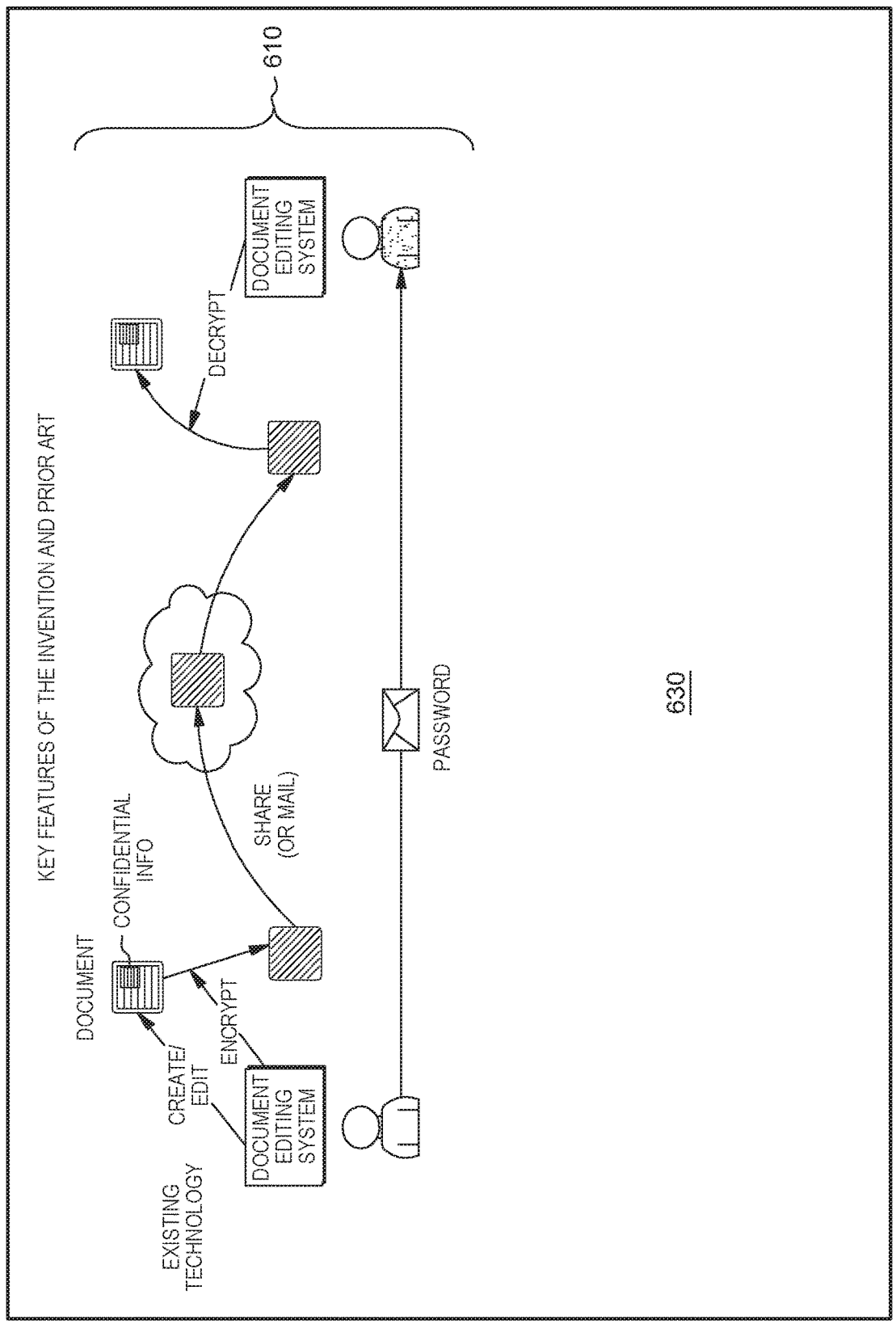
FIG. 6(B) is a diagram illustrating a dummy visibility level or display mode of the confidential information in the presentation document shown in FIG. 6(A), in accordance with one embodiment of the present invention.
Figure 6C:
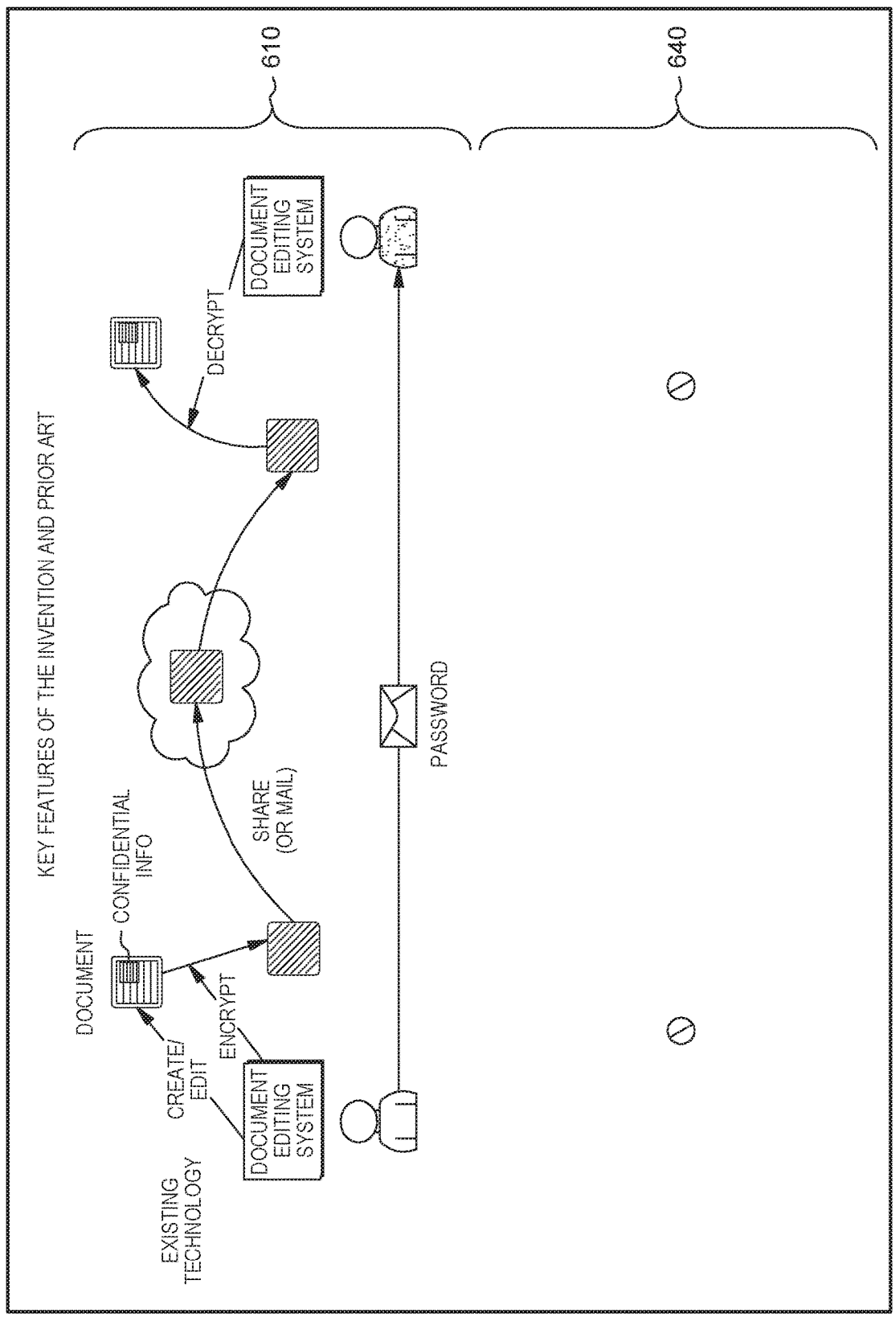
FIG. 6(C) is a diagram illustrating a marker visibility level or display mode of the confidential information in the presentation document shown in FIG. 6(A), in accordance with one embodiment of the present invention.
Figure 6D:
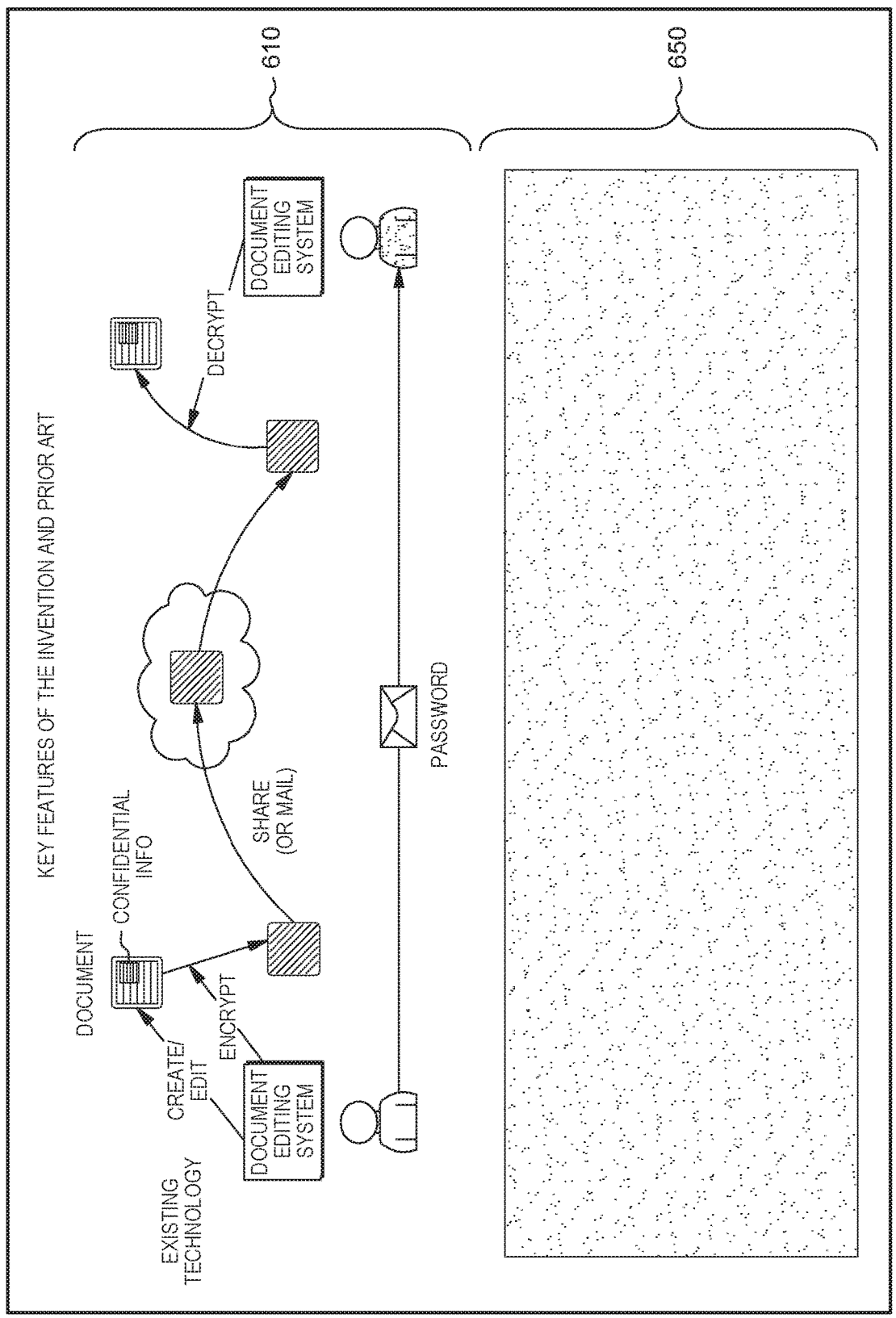
FIG. 6(D) is a diagram illustrating a range visibility level or display mode of the confidential information in the presentation document shown in FIG. 6(A), in accordance with one embodiment of the present invention.

FIG. 6(A) is a diagram illustrating a presentation document containing non-confidential information 610 and confidential information 620, in accordance with one embodiment of the present invention. FIG. 6(B) is a diagram illustrating a dummy visibility level or display mode of confidential information 620 in the presentation document shown in FIG. 6(A), in accordance with one embodiment of the present invention. With the dummy visibility level or display mode, content of non-confidential information 610 is displayed; however, content of confidential information 620 is not displayed, as shown by numeral 630. A reader is not aware that the confidential information exists in the slide of the presentation document. FIG. 6(C) is a diagram illustrating a marker visibility level or display mode of confidential information 620 in the presentation document shown in FIG. 6(A), in accordance with one embodiment of the present invention. With the marker visibility level or display mode, content of non-confidential information 610 is displayed; however, content of confidential information 620 is replaced by marker ☐, as shown by numeral 640. A reader is aware of the presence of the confidential information in the slide, but the reader cannot know how much confidential information are replaced in the slide. FIG. 6(D) is a diagram illustrating a range visibility level or display mode of confidential information 620 in the presentation document shown in FIG. 6(A), in accordance with one embodiment of the present invention. With the range visibility level or display mode, content of non-confidential information 610 is displayed; however, content of confidential information 620 is blocked, as shown by numeral 650. A reader recognizes the presence of the confidential information in the slide; furthermore, the reader knows how much area the confidential information occupies in the slide.

A document editing system such as document editing system 1 110 shown in FIG. 1 writes multiple separated parts of the confidential information into a confidential part file such as confidential part file 170 shown in FIG. 1. When the confidential part file is read on a document editing system such as document editing system 2 120 shown in FIG. 1, the confidential part file is displayed at visibility levels or in display modes of the confidential information, in accordance with access authorization levels. When an authorization level of an authorized user is identified through authentication, the document editing system such as document editing system 2 120 shown in FIG. 1 displays the confidential information at the visibility levels or the display modes in accordance with an access authorization level of the authorized user. For example, the authentication of access to a storage location of the confidential part file can be used to authenticate the authorization level of the authorized user. An example of authorization levels and its corresponding visibility levels is shown in Table 2. As shown in Table 2, a user with a highest authorization level can edit the confidential information, a user with a high authorization level can view the confidential information, a user with a medium authorization level can view the confidential information at the range visibility level, a user with a low authorization level can view the confidential information at the marker visibility level, and a user with a lowest authorization level can view the confidential information at the dummy visibility level.

TABLE 2

| Authorization Levels | Visibility Levels |
| --- | --- |
| Highest | Editable |
| High | Show |
| Medium | Range |
| Low | Marker |
| Lowest | Dummy |

Figure 7:
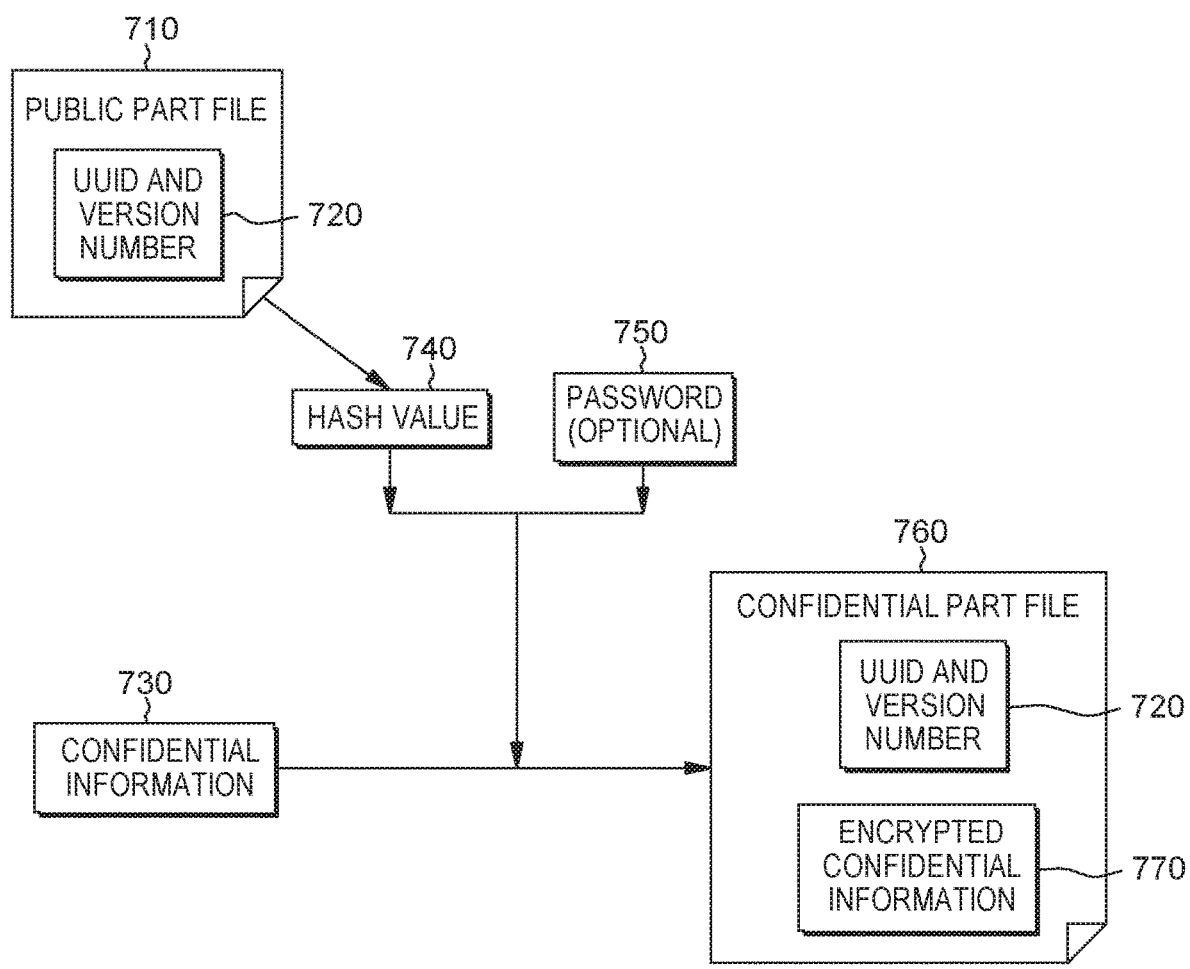
FIG. 7 is a diagram illustrating encryption of confidential information, in accordance with one embodiment of the present invention.

FIG. 7 is a diagram illustrating encryption of confidential information, in accordance with one embodiment of the present invention. When a document editing system creates public part file 710, the document editing system generates hash value 740 from entire content of public part file 710. For example, every byte or character included in public part file 710 is used to generated hash value 740. Because hash value 740 is generated from the entire file content, any modification in any part of public part file 710 changes hash value 740. The document editing system creates a key based on hash value 740. In another embodiment, optionally, the document editing system requires a user to enter password 750, and the document editing system creates a key by combination of hash value 740 and password 750. With the key, the document editing system encrypts confidential information 730 and generates encrypted confidential information 770 in confidential part file 760. For confidential part file 760 to identify public part file 710, the document editing system writes UUID and version number 720 in confidential part file 760. UUID and version number 720 in confidential part file 760 is written without encryption.

The encryption shown in FIG. 7 has following effects. (1) The security level of the confidential information is raised.

(2) Because the hash value changes when any modification in any part of the public part file is made, it becomes impossible to tamper the public part file and change visibility levels or display modes of the confidential information.

Figure 8:
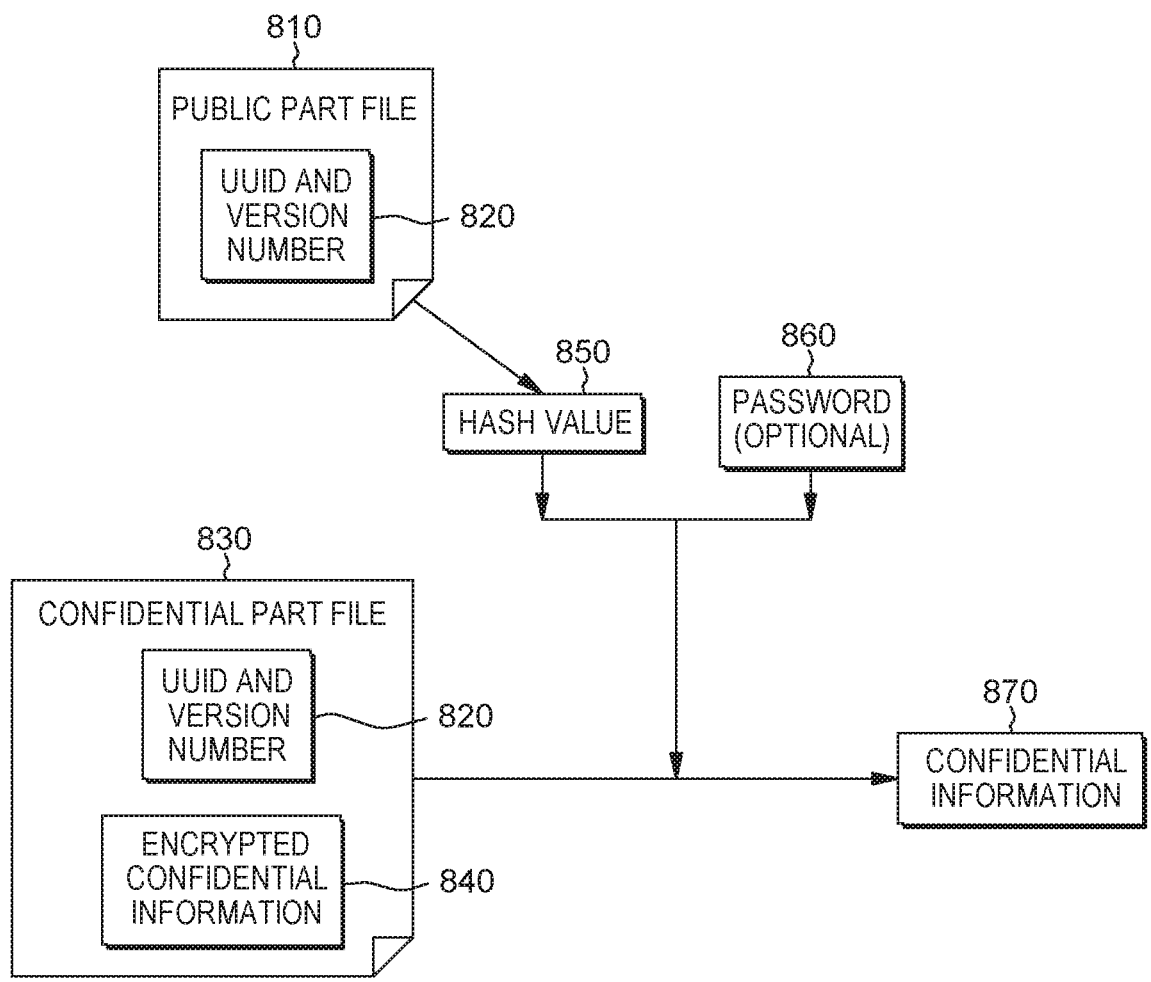
FIG. 8 is a diagram illustrating decryption of encrypted confidential information, in accordance with one embodiment of the present invention.

FIG. 8 is a diagram illustrating decryption of encrypted confidential information, in accordance with one embodiment of the present invention. When confidential part file 830 is read on a document editing system, the document editing system recognizes public part file 810 by comparing UUID and version number 820 in both files. The document editing system generates hash value 850 from entire content of public part file 810 and creates a key based on hash value 850. In another embodiment, if a password is entered in the process of encryption of the confidential information as shown in FIG. 7, the document editing system requires a user to enter password 860 and then creates a key by combination of hash value 850 and password 860. With the key, the document editing system decrypts encrypted confidential information 840 in confidential part file 830 and generates confidential information 870.

Figure 9:
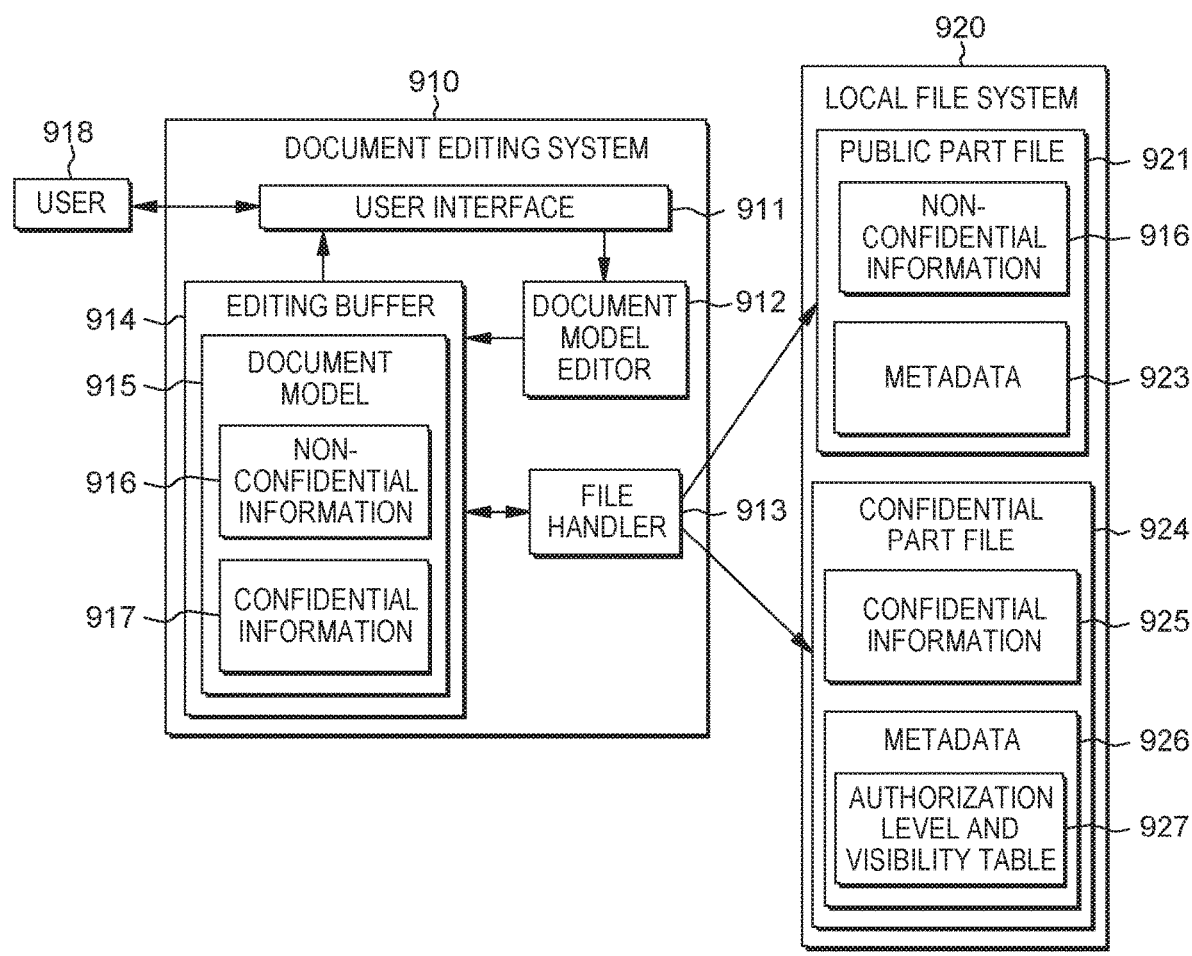
FIG. 9 is a diagram illustrating a document editing system and a local file system, in accordance with one embodiment of the present invention.

FIG. 9 is a diagram illustrating document editing system 910 and local file system 920, in accordance with one embodiment of the present invention. Document editing system 910 comprises user interface 911. User interface 911 is an interface between user 918 and other components of document editing system 910. The other components of document editing system 910 include editing buffer 914, document model editor 912, and file handler 913. When user 918 requests for editing a document (such as file 150 shown in FIG. 1), document editing system 910 creates document model 915 in editing buffer 914. Document model 915 includes non-confidential information 916 and confidential information 917. User 918 uses document model editor 912 (through user interface 911) to edit document model 915 and assigns confidential attributes to confidential information 917. After the edition of document model 915 is finished, file handler 913 saves non-confidential information 916 into public part file 921 in local file system 920 and saves confidential information 917 into confidential part file 924 in local file system 920. In another embodiment, such as one shown in FIG. 1, the public part file is stored in cloud while the confidential part file is stored in a local file system. In yet another embodiment such as one shown in FIG. 2, the public part file is stored in cloud while the confidential part file is stored in secured cloud.

Referring to FIG. 9, in public part file 921, confidential information 917 is replaced by metadata 923 of confidential information 917. Metadata 923 includes IDs, locations, and sizes of confidential information 917. Metadata 923 also includes visibility levels (or display modes) of showing no confidential information. Confidential part file 924 includes confidential information 925. In an embodiment, optionally, confidential information 925 is encrypted according to a protocol of encryption described in paragraphs with reference to FIG. 7. Confidential part file 924 also includes metadata 926 which includes IDs, locations, and sizes of confidential data 917. Metadata 926 in confidential part file 924 further includes authorization level and visibility table 927. An example of authorization level and visibility table 927 is shown in Table 2 (which is presented previously).

Figure 10:
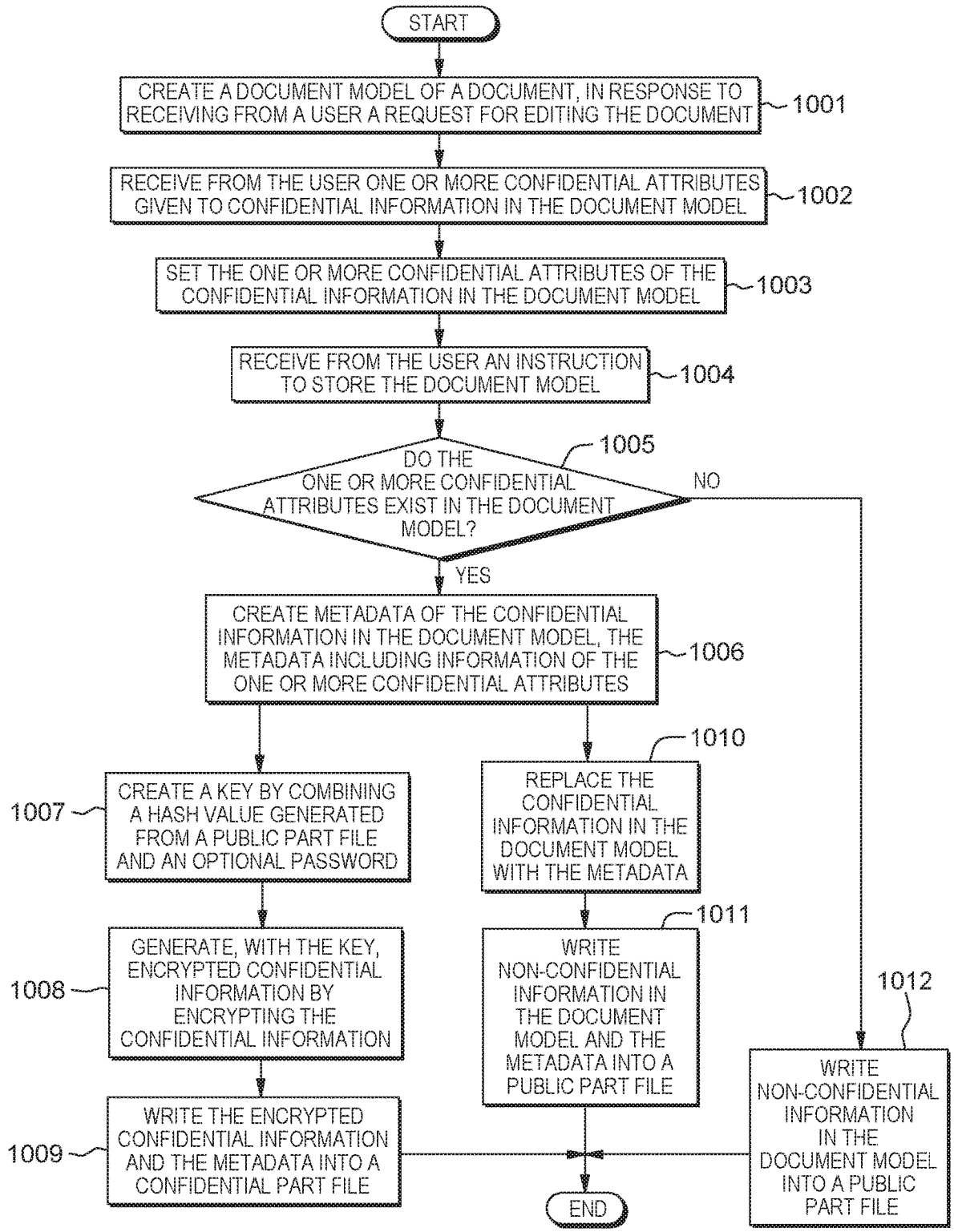
FIG. 10 is a flowchart showing operational steps for separating confidential information from a document by generating a confidential part file and a public part file, in accordance with one embodiment of the present invention.

FIG. 10 is a flowchart showing operational steps for separating confidential information from a document by generating a confidential part file and a public part file, in accordance with one embodiment of the present invention. The operational steps in FIG. 10 are implemented by a document editing system (such as document editing system 910 shown in FIG. 9).

At step 1001, the document editing system creates a document model of a document, in response to receiving from a user a request for editing the document. The document contains both confidential information and non-confidential information. For example, as shown in FIG. 9, document editing system 910 creates document model 915 in editing buffer 914.

At step 1002, the document editing system receives from the user one or more confidential attributes given to the confidential information in the document model. The one or more confidential attributes include IDs, locations, sizes, visibility levels (or display modes) of the confidential information, and authorization levels. Authorization levels and visibility levels (or display modes) have been discussed in previous paragraphs. In one embodiment, the confidential information exists as multiple separated parts in the document model; different confidential attributes are given to respective ones of the multiple separated parts of the confidential information.

At step 1003, the document editing system sets the one or more confidential attributes of the confidential information in the document model. At step 1004, the document editing system receives from the user an instruction to store the document model. At step 1005 (decision block), the document editing system determines whether the one or more confidential attribute exist in the document model.

In response to determining that the one or more confidential attributes exist in the document model (YES branch of step 1005), at step 1006, the document editing system creates metadata of the confidential information in the document model. The metadata includes information of the one or more confidential attributes. The metadata has been discussed in detail in a previous paragraph with reference to FIG. 9. In response to determining that no confidential attribute exists in the document model (NO branch of step 1005), the document editing system at step 1012 writes non-confidential information in the document model into a public part file.

After step 1006, the document editing system implements steps 1007-1009 to create the confidential part file and steps 1010-1011 to creates the public part file.

At step 1007, the document editing system creates a key based on a hash value which is generated from entire content of the public part file. Optionally, the document editing system creates a key by combining the hash value and a password entered by the user. Detailed description of generating a key for encryption is given in a previous paragraph with reference to FIG. 7. At step 1008, the document editing system generates encrypted confidential information by encrypting, with the key, the confidential information. Description of encryption of the confidential information has been provided in paragraphs with reference to FIG. 7. At step 1009, the document editing system writes the encrypted confidential information and the metadata into the confidential part file (such as confidential part file 924 shown in FIG. 9). The metadata in the confidential part file includes IDs, locations, and sizes of the confidential information. The metadata further includes visibility levels of the confidential information and authorization levels.

At step 1010, the document editing system replaces the confidential information in the document model with the metadata. At step 1011, the document editing system writes non-confidential information in the document model and the metadata into the public part file. The metadata in the public part file includes IDs, locations, and sizes of the confidential information. The metadata further includes visibility levels (or display modes) of showing no confidential information.

The metadata in the public part file is a reference to the confidential information in the confidential part file.

Figure 11:
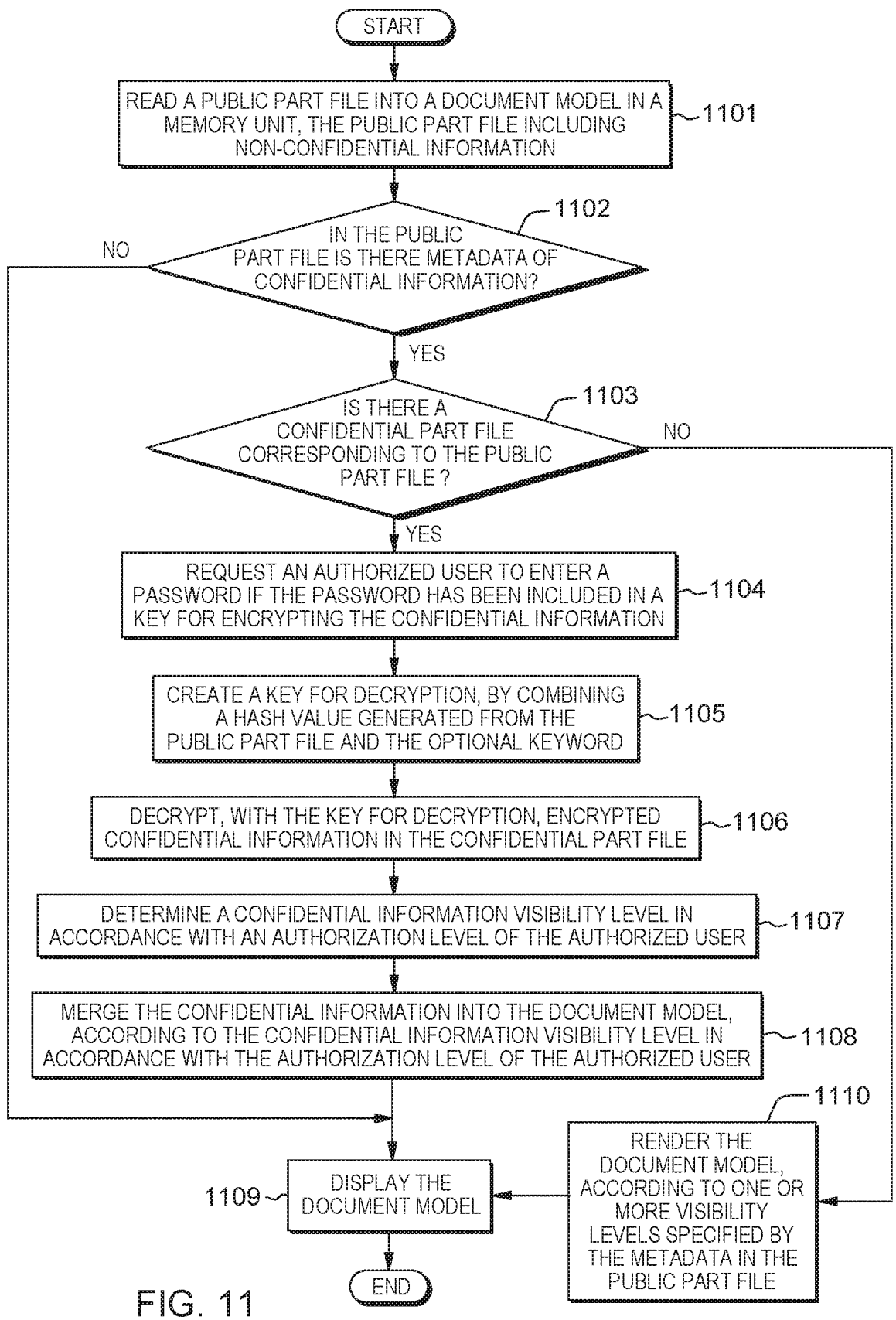
FIG. 11 is a flowchart showing operational steps for merging confidential information in a confidential part file and non-confidential information in a public part file, in accordance with one embodiment of the present invention.

FIG. 11 is a flowchart showing operational steps for merging confidential information in a confidential part file and non-confidential information in a public part file, in accordance with one embodiment of the present invention. The operational steps in FIG. 11 are implemented by a document editing system (such as document editing system 2 120 shown in FIG. 1).

At step 1101, the document editing system reads a public part file into a document model in a memory unit of the document editing system. The public part file includes non-confidential information and is created in the operation steps shown in FIG. 10. At step 1102, the document editing system determines whether in the public part file there is metadata of the confidential information. In response to determining that there is no such metadata in the public part file (NO branch of step 1102), the document editing system at step 1109 displays the document model; under this situation, the document model does not have any confidential information. In response to determining that there is such metadata in the public part file (YES branch of step 1102), the document editing system at step 1103 determines whether there is a confidential part file corresponding to the public part file. The confidential part file contains the confidential information and is created in the operation steps shown in FIG. 10.

In response to determining that there is no such confidential part file corresponding to the public part file (NO branch of step 1103), the document editing system at step 1110 renders the document model, according to one or more visibility levels or display modes specified by the metadata in the public part file. When the public part file is created, the metadata replaces the confidential information; the metadata in the public part file includes IDs, locations, and sizes of the confidential information, and the metadata further includes visibility levels (or display modes) of showing no confidential information. For example, the visibility levels (or display modes) of showing no confidential information are dummy, range, and marker, which are discussed in previous paragraphs. At step 1109, the document editing system displays the document model; under this situation, the document model does not show any confidential information because the visibility levels (or display modes) are dummy, range, and/or marker.

In response to determining that there is the confidential part file corresponding to the public part file (YES branch of step 1103), at step 1104, the document editing system requests an authorized user to enter a password if the password has been included in a key for encrypting the confidential information. The generation of the key including the password for encryption is discussed in detail in previous paragraphs related to FIG. 7.

At step 1105, the document editing system creates a key for decryption, based on a hash value which is generated from entire content of the public part file. Optionally, the document editing system creates a key for decryption by combining the hash value and the password entered by the authorized user. Detailed description of creating a key for decryption is given in a previous paragraph with reference to FIG. 8.

At step 1106, the document editing system decrypts, with the key for decryption, encrypted confidential information in the confidential part file, in response to determining that the confidential information has been encrypted. At step 1107, the document editing system determines a confidential information visibility level (or display mode) in accordance with an authorization level of the authorized user. At step 1108, the document editing system merges the confidential information into the document model, according to the confidential information visibility level (or display mode) in accordance with the authorization level of the authorized user. At step 1109, the document editing system displays the document model; under this situation, the document editing system displays the confidential information at the confidential information visibility level (or display mode) in accordance with the authorization level of the authorized user.

Figure 12:
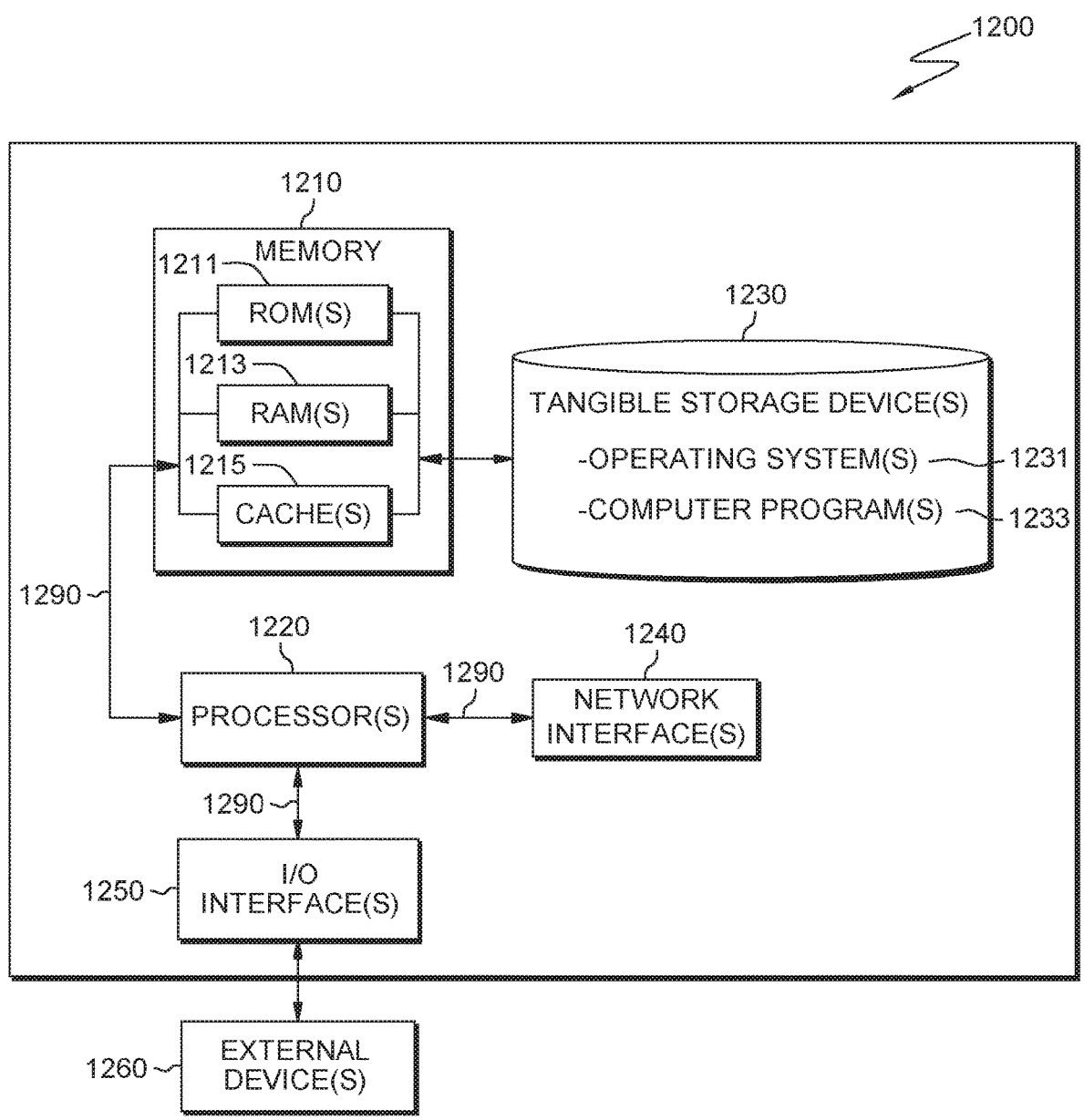
FIG. 12 is a diagram illustrating components of a computer device hosting a document editing system or a local file system, in accordance with one embodiment of the present invention.

FIG. 12 is a diagram illustrating components of computer device 1200 implementing hosting a document editing system or a local file system, in accordance with one embodiment of the present invention. It should be appreciated that FIG. 12 provides only an illustration of one implementation and does not imply any limitations with regard to the environment in which different embodiments may be implemented. The computer device may be any electronic device or computing system capable of receiving input from a user, executing computer program instructions, and communicating with another electronic device or computing system via a network.

Referring to FIG. 12, device 1200 includes processor(s) 1220, memory 1210, and tangible storage device(s) 1230. In FIG. 12, communications among the above-mentioned components of device 1200 are denoted by numeral 1290. Memory 1210 includes ROM(s) (Read Only Memory) 1211, RAM(s) (Random Access Memory) 1213, and cache(s) 1215. One or more operating systems 1231 and one or more computer programs 1233 reside on one or more computer readable tangible storage device(s) 1230. Device 1200 further includes I/O interface(s) 1250. I/O interface(s) 1250 allows for input and output of data with external device(s) 1260 that may be connected to device 1200. Device 1200 further includes network interface(s) 1240 for communications between device 1200 and a computer network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device, such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, and conventional procedural programming languages, such as the "C" programming language, or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for securely sharing confidential information in a document, the method comprising:
    setting, by a first computer, one or more confidential attributes of the confidential information in the document, the one or more confidential attributes including one or more visibility levels of the confidential information and one or more authorization levels of access to the confidential information;
    creating, by the first computer, metadata of the confidential information, the metadata including information of the one or more confidential attributes;
    creating, by the first computer, a first file including the confidential information and the metadata;
    creating, by the first computer, a second file including non-confidential information in the document and the metadata, the metadata in the second file being as a reference to the confidential information;
    generating, by the second computer, a hash value from the second file;
    determining, by the second computer, whether a password has been entered during encryption of the confidential information;
    in response to determining that the password has been entered during the encryption of the confidential information, requesting, by the second computer, the authorized user of the second computer to enter the password, and creating, by the second computer, a key for decryption, by combing the hash value and the password;
    in response to determining that no password has been entered during the encryption of the confidential information, creating, by the second computer, the key for the decryption, based on the hash value;

decrypting, by the second computer, with the key for the decryption, encrypted confidential information in the first file;

wherein the confidential information in the first file is displayed by a second computer at a confidential information visibility level in accordance with an authorization level of an authorized user of the second computer; and wherein the second file is displayed at a visibility level of showing no confidential information, wherein the second file is accessible by all users.

2. The method of claim 1, further comprising:

reading, by the second computer, the second file into a document model;

determining, by the second computer, whether the metadata of the confidential information exists in the second file;

determining, by the second computer, whether the first file corresponding to the second file exists, in response to determining that the metadata of the confidential information exists in the second file;

determining, by the second computer, the confidential information visibility level in accordance with the authorization level of the authorized user, in response to determining that the first file corresponding to the second file exists;

merging, by the second computer, the confidential information in the second file into the document model, according to the confidential information visibility level in accordance with the authorization level of the authorized user; and displaying, by the second computer, the document model, wherein the document model includes the confidential information.

3. The method of claim 2, further comprising:

in response to determining that the metadata of the confidential information does not exist in the second file, displaying, by the second computer, the document model, wherein the document model includes content of the second file.

4. The method of claim 2, further comprising:

in response to determining that the metadata of the confidential information exists in the second file and the first file corresponding to the second file does not exist, rendering the document model, by the second computer, according to the one or more visibility levels specified by the metadata in the second file; and displaying, by the second computer, the document model, wherein the document model does not show the confidential information.

5. The method of claim 1, further comprising:

generating, by the first computer, a hash value from the second file;

requesting, by the first computer, a user of the first computer to enter a password;

determining, by the first computer, whether the user of the first computer enters the password;

in response to determining that the user of the first computer does not enter the password, creating, by the first computer, a key for encryption, based on the hash value;

in response to determining that the user of the first computer enters the password, creating, by the first computer, the key for the encryption, by combing the hash value and the password;

encrypting, by the first computer, with the key for the encryption, the confidential information to generate encrypted confidential information; and writing, by the first computer, the encrypted confidential information into the first file.

6. A computer program product for securely sharing confidential information in a document, the computer program product comprising a computer readable storage medium having program code embodied therewith, the program code executable to:

set, by a first computer, one or more confidential attributes of the confidential information in the document, the one or more confidential attributes including one or more visibility levels of the confidential information and one or more authorization levels of access to the confidential information;

create, by the first computer, metadata of the confidential information, the metadata including information of the one or more confidential attributes;

create, by the first computer, a first file including the confidential information and the metadata;

create, by the first computer, a second file including non-confidential information in the document and the metadata, the metadata in the second file being as a reference to the confidential information;

generate, by the second computer, a hash value from the second file;

determine, by the second computer, whether a password has been entered during encryption of the confidential information;

request, by the second computer, the authorized user of the second computer to enter the password, and create, by the second computer, a key for decryption, by combing the hash value and the password, in response to determining that the password has been entered during the encryption of the confidential information;

create, by the second computer, the key for the decryption, based on the hash value, in response to determining that no password has been entered during the encryption of the confidential information;

decrypt, by the second computer, with the key for the decryption, encrypted confidential information in the first file;

wherein the confidential information in the first file is displayed by a second computer at a confidential information visibility level in accordance with an authorization level of an authorized user of the second computer; and wherein the second file is displayed at a visibility level of showing no confidential information, wherein the second file is accessible by all users.

7. The computer program product of claim 6, further comprising the program code executable to:

read, by the second computer, the second file into a document model;

determine, by the second computer, whether the metadata of the confidential information exists in the second file;

determine, by the second computer, whether the first file corresponding to the second file exists, in response to determining that the metadata of the confidential information exists in the second file;

determine, by the second computer, the confidential information visibility level in accordance with the authorization level of the authorized user, in response to determining that the first file corresponding to the second file exists;

merge, by the second computer, the confidential information in the second file into the document model, according to the confidential information visibility level in accordance with the authorization level of the authorized user; and display, by the second computer, the document model, wherein the document model includes the confidential information.

8. The computer program product of claim 7, further comprising the program code executable to:

display, by the second computer, the document model, wherein the document model includes content of the second file, in response to determining that the metadata of the confidential information does not exist in the second file.

9. The computer program product of claim 7, further comprising the program code executable to:

render, by the second computer, the document model, according to the one or more visibility levels specified by the metadata in the second file, in response to determining that the metadata of the confidential information exists in the second file and the first file corresponding to the second file does not exist; and display, by the second computer, the document model, wherein the document model does not show the confidential information.

10. The computer program product of claim 6, further comprising the program code executable to:

generate, by the first computer, a hash value from the second file;

request, by the first computer, a user of the first computer to enter a password;

determine, by the first computer, whether the user of the first computer enters the password;

create, by the first computer, a key for encryption, based on the hash value, in response to determining that the user of the first computer does not enter the password;

create, by the first computer, the key for the encryption, by combing the hash value and the password, in response to determining that the user of the first computer enters the password;

encrypt, by the first computer, with the key for the encryption, the confidential information to generate encrypted confidential information; and write, by the first computer, the encrypted confidential information into the first file.

11. A computer system for securely sharing confidential information in a document, the computer system comprising:

one or more processors, one or more computer readable tangible storage devices, and program instructions stored on at least one of the one or more computer readable tangible storage devices for execution by at least one of the one or more processors, the program instructions executable to:

set, by a first computer, one or more confidential attributes of the confidential information in the document, the one or more confidential attributes including one or more visibility levels of the confidential information and one or more authorization levels of access to the confidential information;

create, by the first computer, metadata of the confidential information, the metadata including information of the one or more confidential attributes;

create, by the first computer, a first file including the confidential information and the metadata;

create, by the first computer, a second file including non-confidential information in the document and the metadata, the metadata in the second file being as a reference to the confidential information;

generate, by the second computer, a hash value from the second file;

determine, by the second computer, whether a password has been entered during encryption of the confidential information;

request, by the second computer, the authorized user of the second computer to enter the password, and create, by the second computer, a key for decryption, by combing the hash value and the password, in response to determining that the password has been entered during the encryption of the confidential information;

create, by the second computer, the key for the decryption, based on the hash value, in response to determining that no password has been entered during the encryption of the confidential information; and decrypt, by the second computer, with the key for the decryption, encrypted confidential information in the first file;

wherein the confidential information in the first file is displayed by a second computer at a confidential information visibility level in accordance with an authorization level of an authorized user of the second computer;

wherein the second file is displayed at a visibility level of showing no confidential information, wherein the second file is accessible by all users.

12. The computer system of claim 11, further comprising the program instructions executable to:

read, by the second computer, the second file into a document model;

determine, by the second computer, whether the metadata of the confidential information exists in the second file;

determine, by the second computer, whether the first file corresponding to the second file exists, in response to determining that the metadata of the confidential information exists in the second file;

determine, by the second computer, the confidential information visibility level in accordance with the authorization level of the authorized user, in response to determining that the first file corresponding to the second file exists;

merge, by the second computer, the confidential information in the second file into the document model, according to the confidential information visibility level in accordance with the authorization level of the authorized user; and display, by the second computer, the document model, wherein the document model includes the confidential information.

13. The computer system of claim 12, further comprising the program instructions executable to:

display, by the second computer, the document model, wherein the document model includes content of the second file, in response to determining that the metadata of the confidential information does not exist in the second file.

14. The computer system of claim 12, further comprising the program instructions executable to:

render, by the second computer, the document model, according to the one or more visibility levels specified by the metadata in the second file, in response to determining that the metadata of the confidential information exists in the second file and the first file corresponding to the second file does not exist; and display, by the second computer, the document model, wherein the document model does not show the confidential information.

15. The computer system of claim 11, further comprising the program instructions executable to:

generate, by the first computer, a hash value from the second file;

request, by the first computer, a user of the first computer to enter a password;

determine, by the first computer, whether the user of the first computer enters the password;

create, by the first computer, a key for encryption, based on the hash value, in response to determining that the user of the first computer does not enter the password;

create, by the first computer, the key for the encryption, by combing the hash value and the password, in response to determining that the user of the first computer enters the password;

encrypt, by the first computer, with the key for the encryption, the confidential information to generate encrypted confidential information; and write, by the first computer, the encrypted confidential information into the first file.

* * * * *